United States Patent Office 3,379,656
Patented Apr. 23, 1968

3,379,656
URETHANEPOLYMER COMPOSITIONS
Jacob Eichhorn, Midland, Mich., assignor to The Dow Chemical Company, Midland, Mich., a corporation of Delaware
No Drawing. Filed May 31, 1960, Ser. No. 32,621
22 Claims. (Cl. 260—2.5)

ABSTRACT OF THE DISCLOSURE

Self-extinguishing compositions are obtained from normally flammable materials such as cellular polyurethane resins in mixtures therewith of a compound having a plurality of bromine atoms in an aliphatic or cycloaliphatic radical and in amount of at least 45% by weight of the compound and a

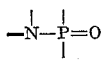

compound made by reacting anhydrous NH₃ with P₂O₅. In examples, the bromine compound is tris(2,3-dibromopropyl) phosphate, 1,2,3,4,5 - pentabromo - 6 - chlorocyclohexane, acetylene tetrabromide, or 1,2,3,4-tetrabromobutane, in amounts of 2–30 parts thereof with 1–20 parts of the nitrogen-phosphorus compound per 100 parts of the resin, by weight.

---

This invention relates to urethane polymer compositions. More particularly, it relates to self-extinguishing polyurethane compositions and cellular structures made from such compositions. This invention also pertains to compositions suitable for rendering materials self-extinguishing.

Polyurethanes are polymers containing repeated

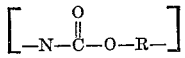

urethane linkages. These polymers are made by reacting a polyisocyanate with a compound having a plurality of active hydrogens. By compound having active hydrogen is meant a compound that gives a positive Zerewitinoff test. Polyurethane resins can be made into foams having excellent strength, durability, low density, light color, uniform cell size and good heat insulating properties, and can be used for many purposes. Unfortunately, these foams burn readily when ignited, that is, they support combustion thus making them unsuitable for certain uses in which fire is a hazard. Accordingly, it is desirable to make polyurethane resin foams which are self-extinguishing so as to eliminate or minimize the hazard of fire. By "self-extinguishing" it is meant that the material is incapable of burning or sustaining a flame for more than a short time after it is separated from an open flame in which it has been heated and ignited. In other words, a composition is considered to be self-extinguishing if it stops burning shortly after a flame used to start its burning has been removed or the material is taken out of the flame.

It has recently been discovered that certain combinations of organic bromides and phosphorus pentoxide act synergistically when uniformly distributed throughout a body of polyurethane resins to render such a body self-extinguishing. Such synergistic combinations are quite satisfactory in that they produce the result desired. However, phosphorus pentoxide is a material which is difficult to handle and it has now been found that it presents certain other difficulties when used in connection with the manufacture of urethane polymers. Phosphorus pentoxide has a powerful affinity for water and if left exposed to air in an open container rapidly becomes moist and sticky. When added in anhydrous form to urethane polymer forming constituents each particle of phosphorus pentoxide withdraws water from material immediately surrounding it. This dehydration caused by phosphorus pentoxide interferes to some extent with regulation of the molar ratio of water to isocyanate radicals when water is used as a blowing agent in making polyurethane foams. In addition, small black specks and streaks are observed in foams made using phosphorus pentoxide in synergistic combination with certain organic bromides to produce self-extinguishing urethane polymer foams. In many uses to which urethane polymers are put, they are in concealed places, as in sandwich boards and insulation and the small black specks and streaks are not considered a serious disadvantage. However, when urethane polymers are used so as to be exposed to view, the small black specks and streaks constitute an aesthetic disadvantage.

It is among the objects of the present invention to provide urethane polymer compositions having improved self-extinguishing properties.

A further object of the present invention is to provide self-extinguishing polyurethane resin foam compositions.

A still further object of this invention is the provision of self-extinguishing polyurethane foams of good strength and appearance in an economical and convenient manner.

Still another object of this invention is the provision of a composition of matter useful for rendering materials self-extinguishing.

These and other objects are accomplished in accordance with the following detailed description of this invention.

It has now been discovered that certain nitrogen-phosphorus complexes, when used in combination with certain organic bromides act synergistically to render urethane polymers self-extinguishing when admixed therewith.

In accordance with the invention it has been found that self-extinguishing urethane polymers are provided when both certain organic bromides and certain nitrogen-phosphorus complexes are present in an intimate mixture in urethane polymer material. The synergistic effect of the organic bromides and the nitrogen-phosphorus complexes in combination, uniformly dispersed throughout the polymeric material is such that a given total amount of a combination of these synergists imparts substantially greater self-extinguishing properties to urethane polymers than does the same amount of either of these materials used alone. In situations in which a quantity of one of the materials used alone produces some self-extinguishing effect on urethane polymers a lesser quantity of the new combination of an organic bromide with the nitrogen-phosphorus complex herein defined will produce the same or an improved effect.

The organic bromides which can be employed according to the invention are organic bromides containing a plurality of bromine atoms in an aliphatic or a cycloaliphatic radical, these bromide atoms constituting at least 45 percent by weight of the molecule. The bromide atoms are preferably attached to adjacent or vicinal carbon atoms in an aliphatic or a cycloaliphatic radical, e.g., the cyclohexyl rdical. The organic bromides can be formed by addition of bromine to an olefinic linkage or by the addition of bromine to the unsaturation of benzene, or by substitution of bromine for hydrogen, e.g., by the bromination of aliphatic organic compounds. Examples of suitable organic bromides are methyl 2,3-dibromopropionate, tris(2,3-dibromopropyl) phosphate, carbon tetrabromide, tetrabromoethylene, 1,2-dibromo-1,1,2,2-tetrachloroethane, 1,1,2,2-tetrabromoethane, dibromodichloromethane, 1,2-dibromo-1,1-dichloroethane, 1,2-dibromo-1,2,2-trichloroethane, 1,2,3,4-tetrabromobutane, pentabromobutane, 1,2,3-tribromopropane, 1,2,4-tribromobutane, tetrabromopentanes, pentabromoethane, hexabromoethane, dibromosuccinic acid, 1,2-di(dibromoethyl)-benzene, alipha,beta-dibromoethylbenzene, 1,2,3,4,5,6-hexabromocyclohexane, 1,2,3,4,5 - pentabromo-6-chlorocyclohexane, tetrabromodichlorocyclohexanes and tribromotrichlorocyclohexanes. The bromochlorohexane compounds can be prepared by reaction of chlorine and bromine with benzene under the influence of actinic radiation, e.g., ultraviolet light or sunlight, employing a procedure similar to that described in Bull. Soc. Chim. (France) pages 118–121 (1949).

In accordance with the invention, the materials that act synergistically with the organic bromides are nitrogen-phosphorus complexes having an atomic ratio of nitrogen to phosphorus of less than 1.5 to 1. These complexes can be made by reacting anhydrous ammonia with phosphorus pentoxide and heating the reaction mixture in the presence of excess anhydrous ammonia at a temperature above about 150° C. for a period of time sufficient to effect a molecular condensation with loss of ammonia. These complexes are substantially neutral materials. Production details and variations for the manufacture of these nitrogen-phosphorus complexes are described in U.S. Patent No. 2,122,122.

As indicated above, polyurethane resins can be made by reacting a polyisocyanate with a compound having a plurality of active hydrogens. Representative examples of polyisocyanates that can be used to make the resin are 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate, ethylene diisocyanate, 1,4-cyclohexylene diisocyanate, 1,3-cyclopentylene diisocyanate and mixtures thereof. Arylene diisocyanates, that is, those in which each of the two isocyanate groups is attached directly to an aromatic ring, are preferred.

The above mentioned compound having a plurality of active hydrogens can be a polyhydroxy compound such as a glycol, triol, hexol, octol, polyesterpolyol, polyetherpolyol and mixtures thereof. Polyesterpolyols can be made by reacting a polybasic acid with an excess of a polyhydric alcohol. If a linear polyesterpolyol is desired, difunctional reactants can conveniently be used, such as phthalic acid or its anhydride with ethylene glycol. A polyetherpolyol can be made by condensing a polyhydroxy compound such as ethylene glycol, glycerol and sucrose with an alkylene oxide such as ethylene oxide, propylene oxide, and 1,2-butylene oxide. Using a mixture of polypropylene oxide-glycerol adducts of the formula:

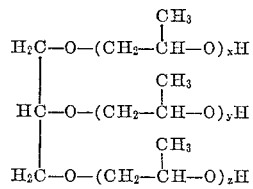

produces a rigid polymer when the sum of $x$, $y$ and $z$ is about 6, and a flexible polymer when the sum of $x$, $y$, and $z$ is about 15 or higher. Relatively low molecular weight alkylene oxide-sucrose condensates produce rigid polymers with polymerized with polyisocyanates. Polymers of varying rigidity and flexibility can be tailored by selecting a condensate or a mixture of condensates of suitable molecular weight and structure to be reacted with the polyisocyanate. Other hydroxyl-rich compounds such as a condensate of ethylene-diamine with propylene oxide can be used to produce useful polyurethanes. By still another approach, polyurethanes can be made by reacting a bischloroformate with a polyamine. In all instances the resulting polymers contain multiple urethane linkages.

Polyurethane resins can be made in cellular form by adding water or a carboxyl group-containing compound to a reaction mixture containing polyisocyanates, whereby carbon dioxide is liberated which causes the liquid reaction mixture to expand and foam. Alternatively, a polyurethane foam may be made by admixing a volatile liquid with one of the reactants, namely, the polyisocyanate or the compound containing a plurality of active hydrogens, before they are mixed. The volatile liquid and the reactants can all be brought together simultaneously or the volatile liquid can be mixed with the reactants shortly after they are brought together. The volatile liquid is converted to a gas when the reactants are combined due to the heat of the reaction or by external heating thereby producing small gas bubbles in the reacting liquid. Representative examples of suitable volatile liquids which can be used for this purpose are trichloromonofluoromethane, hexane, methylchloroform, symmetrical tetrachlorodifluoroethane, and trichlorotrifluoroethane.

A catalyst for the reaction between the isocyanate radical and active hydrogen can be used when making urethane polymers and is usually desirable when a product of cellular form is to be made. Representative examples of suitable catalysts are, triethylenediamine, dibutyltin dilaurate, triethylamine, N,N-dimethylcyclohexylamine, cobalt naphthenate and stannous octoate.

If desired, a cell size control agent can be added to the reaction mixture. Materials such as copolymers of polyethylene glycol and dimethylsiloxane serve to produce cells of smaller size in polyurethane foams. These materials can be made as described in British Patent No. 793,501. Representative examples of other cell size control agents are sodium dioctyl sulfosuccinate and zinc stearate.

The organic bromide and the nitrogen-phosphorus complex can be incorporated in the resin by any method which gives uniform distribution of the agents throughout the body of the resin and which does not cause or result in appreciable deterioration or decomposition of either of said agents or the resin.

The organic bromide and the nitrogen-phosphorus complex can be premixed and then added to the isocyanate material or the active hydrogen containing material before the said materials are brought together to form the polymer. Alternatively, the synergists of this invention can be premixed and then blended with the polymer forming reactants as they are brought together or shortly after they are combined and before the reaction has proceeded to a point where uniform dispersion of the synergists in the polymer is no longer practicable. If desired, the synergistic agents of this invention may be added one at a time to the polymer forming constituents. To illustrate, one of the agents can be added to the isocyanate material, to the active hydrogen containing material, to a mixture of these materials as they are brought together or shortly thereafter and before the reaction of the polymer forming constituents has proceeded to a point where uniform dispersion of the additive in the polymer is no longer practicable, or at two or more of these places. The other agent can be added at one or more of the above places which may be the same or different from where the first agent is added.

The formulations of this invention can be made by batch methods employing either hand mixing or simple stirring equipment. Several types of mechanical equipment are available which can automatically meter the constituents to a mixer and dispense foams in predetermined quantities. This equipment can be run either continuously or intermittently.

Self-extinguishing polymer compositions of this invention can be made into useful articles by conventional molding, casting, coating and laminating techniques. Foams of these compositions can be cast onto a conveyor belt to produce sheets or slabs of self-extinguishing polyurethane foams which may then be cut up into convenient sizes. The self-extinguishing foams made from the compositions of this invention can be cast in molds to make desired shapes or the foams can be cast in place to fill voids in a final article as in the potting of electrical equipment and the strengthening of double walled members.

The following examples, in which parts and percentages are by weight unless otherwise indicated, are illustrative of the present invention but the invention is not limited thereto.

Example I

There are dissolved in 33.6 parts of a polyol [having a hydroxyl content of about 17.3 percent (determined by acetylation) and a viscosity of 200 stokes at 24° C. formed by reacting a mixture of equal parts of glycerine and sucrose with propylene oxide] ¼ part of triethylenediamine and ¼ part of dibutyltin dilaurate. Into this solution there is then admixed ¼ part of a copolymer of polyethylene glycol and dimethylsiloxane, the copolymer having an average molecular weight of 2,500 and made as described in British Patent No. 793,501. The mixture is stirred and cooled to 50° F. To this cooled mixture is then added with stirring 12.4 parts of trichlorofluoromethane as a blowing agent. The above composition is rapidly admixed in a container with 53.25 parts of an adduct of a polyol and an excess of a mixture of tolylene diisocyanates, there being 80 percent of the 2,4-isomer and 20 percent of the 2,6-isomer in the diisocyanate mixture. The polyol has an average molecular weight of 4000 and is made by condensing propylene oxide with glycerine. The excess of the tolylene diisocyanate is such that the —NCO content of the adduct is about 30 percent. The polyol-tolylene diisocyanate adduct has a viscosity of 105 stokes at 24° C. Based on the weight of the above total mixture there is then added 20 parts per hundred of tris(2,3-dibromopropyl) phosphate and 2.6 parts per hundred of a powdered nitrogen-phosphorus complex having an atomic ratio of nitrogen to phosphorus of less than 1.5 to 1 and made by reacting anhydrous ammonia with phosphorus pentoxide and heating the reaction mixture in the presence of excess anhydrous ammonia at a temperature above about 150° C. for a period of time sufficient to effect a molecular condensation with loss of ammonia. Stirring is again employed to assure uniform distribution of all constituents. The mass begins to foam and is discharged into a mold. When the foam has gelled it is placed in a curing oven at 70° C. After 15 minutes the foam is removed from the oven and allowed to cool to room temperature. The cellular mass is a white, rigid, fine-celled foam.

A test strip is cut from the foamed product and tested for flammability. The strip is in the shape of a rectangular prism three inches long, ¾ inch wide, and 3/16 inch thick. The strip is placed in the flame of a microburner and after approximately four seconds, it is removed. Upon removal from the microburner flame, the strip is itself aflame, and continues to burn for 1 second from the time it is removed from the microburner flame. After the 1 second has elapsed, the flame on the foamed polymer strip goes out, that is, the material no longer sustains a flame, and is said to have a self-extinguishing time of 1 second.

Examples II through V

Foam strips are made and tested as in Example I using the same materials and procedures except that the amount of the nitrogen-phosphorus complex is increased to 6.6 parts per hundred and 10 parts of one of each of the organic bromide listed below is substituted for the organic bromide used in Example I. The results obtained appear in Table I.

TABLE I

| Example | Organic Bromide | S.E.[1] Time (seconds) |
|---|---|---|
| II | 1,2,3,4,5-pentabromo-6-chlorocyclohexane | 6 |
| III | Acetylene tetrabromide | 5 |
| IV | 1,2,3,4-tetrabromobutane | 4.5 |
| V | Tris(2,3-dibromopropyl) phosphate | 2 |

[1] Abbreviation for "Self-Extinguishing."

Example VI

A foam strip is made and tested as in Example III using the same materials and procedures except that the amount of the nitrogen-phosphorus complex is increased to 10.5 parts to act synergistically with the 10 parts of acetylene tetrabromide as used therein. The strip has an S.E. time of 1½ seconds.

By contrast, foam strips are made and tested in the manner described in Example I using the same constituents and procedure but omitting either the nitrogen-phosphorus complex or the organic bromide and varying the amount of these agents used. The results of the tests are shown in Table II.

TABLE II

| Fire Extinguishing Reagent | Amount Added (p.p.h.)[1] | S.E. Time (seconds) |
|---|---|---|
| The nitrogen-phosphorus complex | 19.7 | 8 |
| Tris(2,3-dibromopropyl) phosphate | 15 | [2] B |
| Do | 20 | 15 |
| Do | 25 | .5 |
| Acetylene tetrabromide | 15 | B |
| 1,2,3,4,5-pentabromo-6-chlorocyclohexane | 15 | B |
| 1,2,3,4-tetrabromobutane | 15 | B |

[1] p.p.h.=parts per hundred. [2] B=burns completely.

Example VII

To 50 parts of a polyglycol having an average molecular weight of 2700 made by reacting propylene oxide with glycerine, are added 50 parts of hydroxyl-terminated polypropylene oxide having an average molecular weight of 2000, 32 parts of 2,4-tolylene diisocyanate, 8 parts of 2,6-tolylene diisocyanate, a mixture of 5 parts of tris(2,3-dibromopropyl) phosphate and 2.6 parts of the nitrogen-phosphorus complex based on the weight of total composition of this example (excluding the bromine compound and the nitrogen-phosphorus complex), 0.85 part of a copolymer of polyethylene glycol and dimethylsiloxane having an average molecular weight of 2500 and made as described in British Patent No. 793,501, 0.5 part stannous octoate, 0.35 part dibutyltin dilaurate and a mixture of 2.9 parts of water with 0.2 part of triethylenediamine. The mixture foams and sets on standing to form a flexible spongy mass. Strips are cut and tested for self-extinguishing quality as in Example I. This material has an S.E. time of 2 seconds.

Example VIII

To 136 parts octakis [2(2-hydroxypropyoxy)propyl] sucrose, made by reacting 1 mole of octakis(2-hydroxypropyl) sucrose with 8 moles of 1,2-propylene oxide, are added ¼ part triethylenediamine, 87 parts of an 80/20 mixture of 2,4- and 2,6-tolylene diisocyanates, 20 parts per hundred of tris(2,3-dibromopropyl) phosphate, 2.6 parts per hundred of the nitrogen-phosphorus complex (each of these latter two constituents being based on the weight of the total composition of this example exclusive of the bromine compound and the said complex), 1.3 parts of a copolymer of polyethylene glycol and dimethylsiloxane, the copolymer having an average molecular weight of 2500 and made as described in the above referenced British patent, and 31.2 parts of trichlorofluoromethane. The constituents are thoroughly mixed and the foam formed is cured in an oven to a rigid cellular mass. Strips of the foam are cut and tested as in Example I. This foam is self-extinguishing in six seconds.

Example IX

The procedure of Example VIII is repeated using the same materials except that the amounts of the bromine compound and the nitrogen-phosphorus complex used are changed. Based on the weight of the total composition exclusive of these two materials there are added 10.5 p.p.h. of the nitrogen-phosphorus complex and 10 p.p.h. of tris(2,3-dibromopropyl) phosphate. This material has an S.E. time of 5 seconds.

Examples X through XII

To 34.58 parts of a polyglycol having an average molecular weight of 2700 made by reacting propylene oxide with glycerine, are added 34.58 parts of hydroxyl-terminated polypropylene oxide having an average molecular weight of 2000, 27.60 parts of an 80/20 mixture of 2,4-tolylene diisocyanate and 2,6-tolylene diisocyanate, and quantities of the nitrogen-phosphorus complex and a bromine compound as indicated in Table III below. Two parts of a copolymer of polyethylene glycol and dimethylsiloxane having an average molecular weight of 2500 and made as described in British Patent No. 793,501, 0.28 part stannous octoate, 0.25 part dibutyltin dilaurate and a mixture of 0.57 part of water with 0.14 part of triethylenediamine are added with stirring. The mixtures foam and set on standing to form a flexible spongy mass. Strips are cut and tested for self-extinguishing quality as in Example I. The result of the test is given in Table III, infra.

TABLE III

| | p.p.h. | | |
|---|---|---|---|
| | Ex. X | Ex. XI | Ex. XII |
| | Ex. X | Ex. XI | Ex. XII |
| Fire Extinguishing Agents: | | | |
| Nitrogen, phosphorus complex | 3.9 | 6.6 | 10.5 |
| 1,2,3,4,5-pentabromo-6-chlorocyclohexane | | 10 | 10 |
| 1,2,3,4-tetrabromobutane | 10 | | |
| S.E. Time (seconds) | 4 | 3 | 3 |

In the practice of the present invention the organic bromides are employed in amounts corresponding to from 2 to 30 percent, preferably from 5 to 15 percent, together with the nitrogen-phosphorus complex in amounts of from 1 to 20 percent, preferably from 2 to 12 percent. The percentages are based on the weight of the polymer, including the blowing agent when a blowing agent is used. Self-extinguishing urethane polymer compositions are obtained by employing both the organic bromides and the nitrogen-phosphorus complex in proportions within these ranges.

It is found that mixtures of the organic bromides of this invention with the nitrogen-phosphorus complex above described are stable. The synergistic combinations of the bromine compounds and the nitrogen-phosphorus complex of this invention can be pre-mixed and then mixed with the polymer forming constituents to render the products self-extinguishing.

When using the synergistic agents of this invention in premixed form, the premixture preferably contains from 5 to 15 parts by weight of organic bromide as above defined, and from 2 to 12 parts by weight of the synergistic nitrogen-phosphorus complex. A composition containing about 10 parts by weight of organic bromide and about 6.6 parts by weight of the nitrogen-phosphorus complex is found especially suitable for purpose of this invention.

In using the mixtures of this invention one or more of the organic bromine compounds can be used with the nitrogen-phosphorus complex. When smaller amounts of the synergistic mixtures are used than indicated in the examples the self-extinguishing time is greater than indicated in the examples; when greater amounts are used the self-extinguishing time becomes less. While greater amounts of the synergistic mixtures than necessary to produce self-extinguishing times of less than one second can be used without harmful effect, the use of such amounts is presently considered uneconomic. It will be understood, that in the practice of the invention, various other additives may be incorporated in the polymer along with the presently disclosed synergists, such as fillers, pigments, dyes, delustrants, plasticizers, stabilizers, and reinforcing materials.

That which is claimed is:

1. A composition of matter comprising a polyurethane resin obtainable by reacting a polyisocyanate and a compound containing active hydrogen as determined by the Zerewitinoff test containing intimately admixed therewith from 2 to 30 parts based on 100 parts by weight of the resin of an organic bromine compound having a plurality of bromine atoms attached to the carbon atoms of a radical selected from the group consisting of cyclohexyl and aliphatic radicals, the bromine atoms constituting at least 45 percent by weight of the compound, and from 1 to 20 parts based on 100 parts by weight of the resin of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

2. A composition according to claim 1 in which the organic bromine compound is tris(2,3-dibromopropyl)-phosphate.

3. A composition according to claim 1 in which the organic bromine compound is 1,2,3,4,5-pentabromo-6-chlorocyclohexane.

4. A composition according to claim 1 in which the organic bromine compound is 1,2,3,4-tetrabromobutane.

5. A composition according to claim 1 in which the organic bromine compound is acetylene tetrabromide.

6. A self-extinguishing foam comprising a normally flammable polyurethane resin obtainable by reacting a polyisocyanate and a compound containing active hydrogen as determined by the Zerewitinoff test in intimate admixture with from 1 to 20 parts based on 100 parts by weight of the resin of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia and from 2 to 30 parts based on 100 parts by weight of the resin of an organic bromine compound having a plurality of bromine atoms attached to carbon atoms of a radical selected from the group consisting of the cyclohexyl and aliphatic radicals, the bromine atoms consisting of at least 45 percent by weight of the organic compound.

7. A self-extinguishing foam according to claim 6 in which the organic bromine compound is tris(2,3-dibromopropyl) phosphate.

8. A self-extinguishing foam according to claim 6 in which the bromine compound is 1,2,3,4,5-pentabromo-6-chlorocyclohexane.

9. A self-extinguishing foam according to claim 6 in which the bromine compound is 1,2,3,4-tetrabromobutane.

10. A self-extinguishing foam according to claim 6 in which the bromine compound is acetylene tetrabromide.

11. A self-extinguishing rigid resin foam comprising a normally flammable polyurethane resin obtainable by reacting a polyisocyanate and a compound containing active hydrogen as determined by the Zerewitinoff test and, uniformly distributed throughout the resin and based on the weight of the polyurethane resin and entrapped gas, from 5 percent to 15 percent of an organic bromine compound having a plurality of bromine atoms attached to carbon atoms of a radical selected from the group consisting of the cyclohexyl and aliphatic radicals, the bromine atoms consisting of at least 45 percent by weight of the organic compound, and from 2 percent to 12 percent, based on the weight of the polyurethane resin and entrapped gas, of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

12. A self-extinguishing rigid cellular material comprising by weight, 100 parts of a polyurethane resin obtainable by reacting a polyisocyanate and a compound containing active hydrogen as determined by the Zerewitinoff test, about 10 parts of tris(2,3-dibromopropyl) phosphate and about 6.6 parts of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

13. A composition of matter for rendering normally flammable materials self-extinguishing when intimately incorporated therein comprising from 5 to 15 parts by weight of an organic bromine compound having a plurality of bromine atoms attached to carbon atoms of a radical selected from the group consisting of cyclohexyl and aliphatic radicals, the bromine atoms constituting at least 45 percent by weight of the organic bromine compound and from 2 to 12 parts by weight of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

14. A composition for rendering normally flammable materials self-extinguishing when intimately incorporated therein comprising about 10 parts by weight of tris(2,3-dibromopropyl) phosphate and about 6.6 parts by weight of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

15. A self-extinguishing rigid cellular material comprising by weight, 100 parts of a polyurethane resin obtainable by reacting a polyisocyanate and a compound containing active hydrogen as determined by the Zerewitinoff test, about 10 parts of 1,2,3,4,5-pentabromo-6-chlorohexane and about 6.6 parts of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

16. A composition for rendering normally flammable materials self-extinguishing when intimately incorporated therein comprising about 10 parts by weight of 1,2,3,4,5-pentabromo-6-chlorocyclohexane and about 6.6 parts by weight of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

17. A composition of matter comprising a polyurethane resin obtainable by reacting a polyisocyanate and a compound containing active hydrogen as determined by the Zerewitinoff test containing intimately admixed therewith from 5 to 15 parts based on 100 parts by weight of the resin of an organic bromine compound having a plurality of bromine atoms attached to the carbon atoms of a radical selected from the group consisting of cyclohexyl and aliphatic radicals, the bromine atoms consisting of at least 45 percent by weight of the compound, and from 2 to 12 parts based on 100 parts by weight of the resin of a nitrogen-phosphorus complex having an atomic ratio of nitrogen to phosphorus of less than 1.5 to 1 which can be made by reacting anhydrous ammonia with phosphorus pentoxide and heating the reaction mixture in the presence of excess anhydrous ammonia to effect molecular condensation with loss of ammonia.

18. A composition according to claim 17 in which the organic bromine compound is tris(2,3-dibromopropyl)-phosphate.

19. A composition according to claim 17 in which the organic bromine compound is 1,2,3,4,5-pentabromo-6-chlorocyclohexane.

20. A composition according to claim 17 in which the organic bromine compound is 1,2,3,4-tetrabromobutane.

21. A composition according to claim 17 in which the organic bromine compound is acetylene tetrabromide.

22. A celular polyurethane resin which is the reaction product of an organic polyisocyanate and a polyhydroxy compound; said cellular resin containing as flame retardant agents based on 100 parts by weight of the resin (A) from 2 to 30 parts by weight of tris(2,3-dibromopropyl) phosphate, and (B) from 1 to 20 parts by weight of a nitrogen-phosphorus compound having the structure

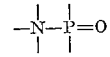

which has been prepared by reacting anhydrous ammonia with phosphorus pentoxide.

References Cited

UNITED STATES PATENTS

| | | | |
|---|---|---|---|
| 2,956,032 | 10/1960 | Joyce. | |
| 2,577,281 | 12/1951 | Simon et al. | 260—2.5 |
| 2,600,455 | 6/1952 | Wilson et al. | |
| 2,658,877 | 11/1953 | Dreisbach et al. | |
| 2,713,536 | 7/1955 | Driskell | 252—8.1 |

FOREIGN PATENTS 810,551  3/1959  Great Britain.

OTHER REFERENCES

Emschwiller et al.: Bull. Soc. Chim. (France), 1949, pp. 118–121.

DONALD E. CZAJA, *Primary Examiner.*

D. ARNOLD, L. J. BERCOVITZ, *Examiners.*

R. C. STEWART, F. McKELVEY, *Assistant Examiners.*